United States Patent
Ichimura et al.

(10) Patent No.: US 10,419,275 B2
(45) Date of Patent: Sep. 17, 2019

(54) INFORMATION PROCESSING APPARATUS INFORMATION PROCESSING SYSTEM, AND NON-TRANSITORY COMPUTER READABLE MEDIUM FOR PROVIDING NOTIFICATION TO A USER OF OCCURRENCE OF A FAULT

(71) Applicant: FUJI XEROX CO., LTD., Tokyo (JP)

(72) Inventors: Takeshi Ichimura, Kanagawa (JP); Nobuyuki Obayashi, Kanagawa (JP); Kenji Nomura, Kanagawa (JP); Kenji Kogure, Kanagawa (JP); Masaki Kurokawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 177 days.

(21) Appl. No.: 15/492,310

(22) Filed: Apr. 20, 2017

(65) Prior Publication Data

US 2018/0019912 A1    Jan. 18, 2018

(30) Foreign Application Priority Data

Jul. 15, 2016  (JP) .................................. 2016-140512

(51) Int. Cl.
*H04N 1/32* (2006.01)
*H04L 12/24* (2006.01)
*B41J 29/48* (2006.01)
*B41J 29/00* (2006.01)

(52) U.S. Cl.
CPC .......... *H04L 41/0677* (2013.01); *B41J 29/00* (2013.01); *B41J 29/48* (2013.01); *H04L 41/06* (2013.01); *H04L 41/0631* (2013.01); *H04N 1/32609* (2013.01); *H04N 1/32625* (2013.01); *H04N 1/32651* (2013.01)

(58) Field of Classification Search
CPC ........ B60R 25/04; B82Y 25/00; G06N 3/006; G16H 40/63; H04N 21/235; H04N 1/32625; H04N 1/32651; H04N 1/32609; H04W 4/02; H04W 8/02; H04L 41/0677; H04L 41/0631; H04L 41/06; B41J 20/00; B41J 20/48

See application file for complete search history.

(56) References Cited

U.S. PATENT DOCUMENTS 6,477,667 B1 *  11/2002  Levi ........................ B60R 25/04
                                                                       714/48
9,573,807 B1 *   2/2017  Kaufman ................ B82Y 25/00
(Continued)

FOREIGN PATENT DOCUMENTS

| JP | 2002-259105 A | 9/2002 |
| JP | 2005-88474 A | 4/2005 |
| JP | 2007-326269 A | 12/2007 |

*Primary Examiner* — Le H Luu
(74) *Attorney, Agent, or Firm* — Oliff PLC (57) ABSTRACT

An information processing apparatus includes a sensing unit that senses occurrence of a predetermined fault through one of detection of the occurrence of the fault and prediction of the occurrence of the fault, and a notifying unit that, when the fault is sensed to have occurred by the sensing unit, identifies a user to be notified that the fault is sensed to have occurred from among multiple users registered in advance, and notifies an information processing terminal of the identified user that the fault has occurred.

9 Claims, 7 Drawing Sheets

(56) References Cited

U.S. PATENT DOCUMENTS

| | | | | |
|---|---|---|---|---|
| 2002/0065950 A1* | 5/2002 | Katz | ................... | H04N 21/235 |
| | | | | 719/318 |
| 2008/0045234 A1* | 2/2008 | Reed | ..................... | H04W 8/02 |
| | | | | 455/456.1 |
| 2013/0337789 A1* | 12/2013 | Johnson | ................. | H04W 4/02 |
| | | | | 455/414.1 |
| 2016/0321418 A1* | 11/2016 | Reid | ..................... | G16H 40/63 |
| 2016/0358065 A1* | 12/2016 | Gedge | ................... | G06N 3/006 |

\* cited by examiner

| TYPE OF FAULT | UNAVAILABLE FUNCTION |
|---|---|
| MOTOR FAILURE IN IMAGE READING UNIT | IMAGE READING, COPY, FACSIMILE |
| OUT OF PAPER | COPY, FACSIMILE |
| PAPER JAM | COPY, FACSIMILE |
| ⋮ | ⋮ |

FIG. 6B

| USER | DESTINATION ADDRESS | NECESSITY OF NOTIFICATION | FUNCTION USAGE HISTORY |
|---|---|---|---|
| USER A | xxxxxxxxxx | YES | COPY: xx.xx.xx<br>FAX: yy.yy.yy |
| USER B | yyyyyyyyyy | NO | PRINT: xx.xx.xx<br>SCAN: yy.yy.yy |
| USER C | zzzzzzzzzz | NO | PRINT: zz.zz.zz<br>SCAN: yy.yy.yy |
| ⋮ | ⋮ | ⋮ | ⋮ |

FIG. 6C

| FUNCTION TYPE | IMAGE READING | COPY | FACSIMILE | .... |
|---|---|---|---|---|
| DESTINATION | xxxxxxxxxx<br>yyyyyyyyyy<br>zzzzzzzzzz<br>⋮ | xxxxxxxxxx<br>zzzzzzzzzz<br>⋮ | yyyyyyyyyy<br>zzzzzzzzzz<br>⋮ | ⋮ |

FIG. 7

| USER A | | | USER B | | | USER C | | |
|---|---|---|---|---|---|---|---|---|
| LOGIN DATE/TIME | SCHEDULE INFORMATION | LOGOFF DATE/TIME | LOGIN DATE/TIME | SCHEDULE INFORMATION | LOGOFF DATE/TIME | LOGIN DATE/TIME | SCHEDULE INFORMATION | LOGOFF DATE/TIME |
| . . . | . . . | . . . | . . . | . . . | . . . | . . . | . . . | . . . |

FIG. 8

INFORMATION PROCESSING APPARATUS INFORMATION PROCESSING SYSTEM, AND NON-TRANSITORY COMPUTER READABLE MEDIUM FOR PROVIDING NOTIFICATION TO A USER OF OCCURRENCE OF A FAULT

CROSS-REFERENCE TO RELATED APPLICATIONS

This application is based on and claims priority under 35 USC 119 from Japanese Patent Application No. 2016-140512 filed Jul. 15, 2016.

BACKGROUND

Technical Field

The present invention relates to an information processing apparatus, an information processing system, and a non-transitory computer readable medium.

SUMMARY

According to an aspect of the present invention, there is provided an information processing apparatus including a sensing unit that senses occurrence of a predetermined fault through one of detection of the occurrence of the fault and prediction of the occurrence of the fault, and a notifying unit that, when the fault is sensed to have occurred by the sensing unit, identifies a user to be notified that the fault is sensed to have occurred from among multiple users registered in advance, and notifies an information processing terminal of the identified user that the fault has occurred.

BRIEF DESCRIPTION OF THE DRAWINGS

Exemplary embodiment of the present invention will be described in detail based on the following figures, wherein.

DETAILED DESCRIPTION

Figure 1:
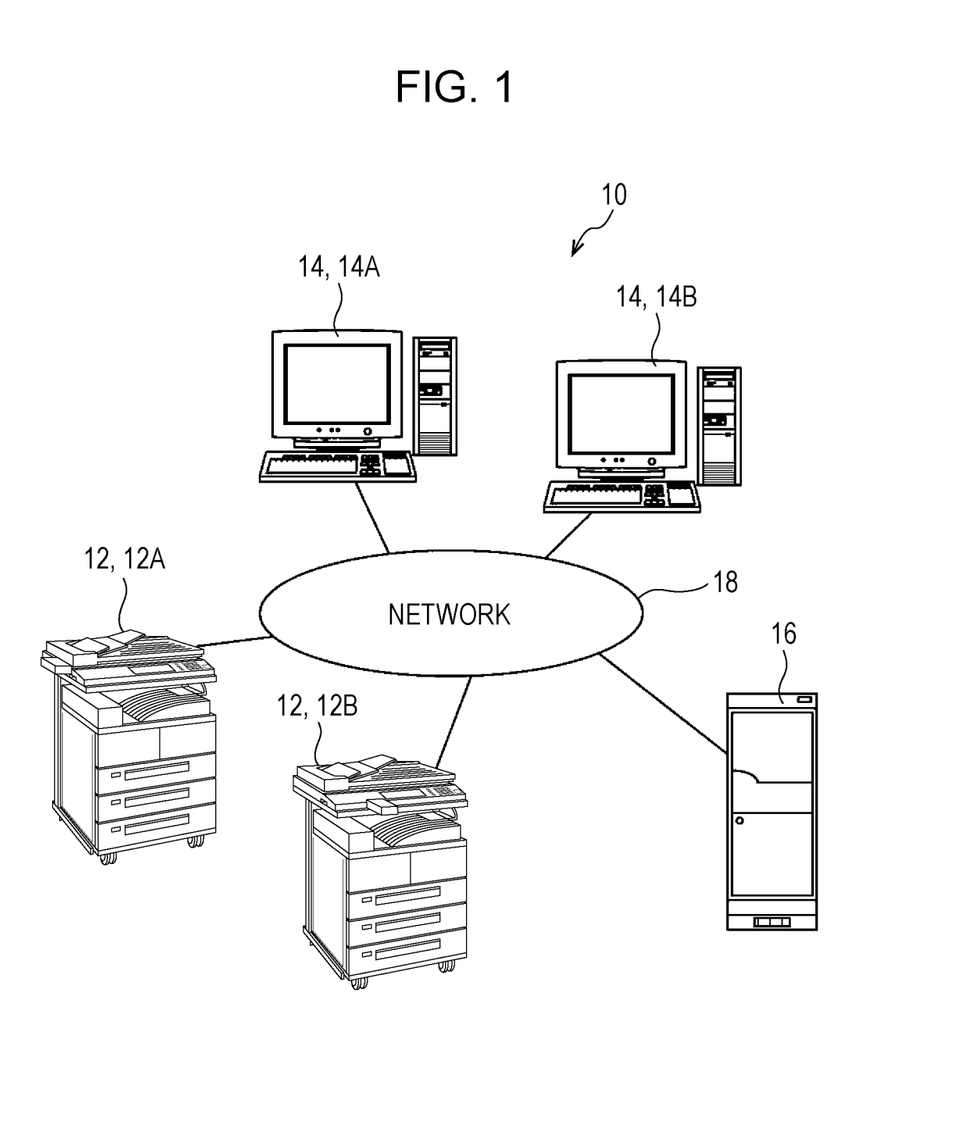
FIG. 1 illustrates a schematic configuration of an image forming system according to an exemplary embodiment.

An exemplary embodiment of the present invention will be described in detail below with reference to the drawings. The following exemplary embodiment will describe, as an example of an information processing system, an image forming system in which multiple image forming apparatuses, multiple information processing apparatuses, and a server are connected to each other via a communication line such as a network. FIG. 1 illustrates a schematic configuration of an image forming system 10 according to the exemplary embodiment.

As illustrated in FIG. 1, the image forming system 10 according to the exemplary embodiment includes multiple image forming apparatuses 12A, 12B, and so on, multiple information processing apparatuses 14A, 14B, and so on, and a server 16. In the following description, when there is no need to distinguish the individual image forming apparatuses 12A, 12B, and so on from each other or the individual information processing apparatuses 14A, 14B, and so on from each other, the last alphabets of the corresponding reference signs will be sometimes omitted. Although the following description of the exemplary embodiment will be directed to a case where the image forming system 10 includes multiple image forming apparatuses 12A, 12B, and so on, at least one of the number of image forming apparatuses 12 and the number of information processing apparatuses 14 may be one. In the exemplary embodiment, the image forming apparatus 12 corresponds to an information processing apparatus, and the information processing apparatus 14 corresponds to an information processing terminal.

The image forming apparatus 12, the information processing apparatus 14, and the server 16 are connected to each other via a network 18 such as a local area network (LAN), a wide area network (WAN), the Internet, or an intranet. The image forming apparatus 12, the information processing apparatus 14, and the server are capable of communicating various data with each other via the network 18.

Figure 2:
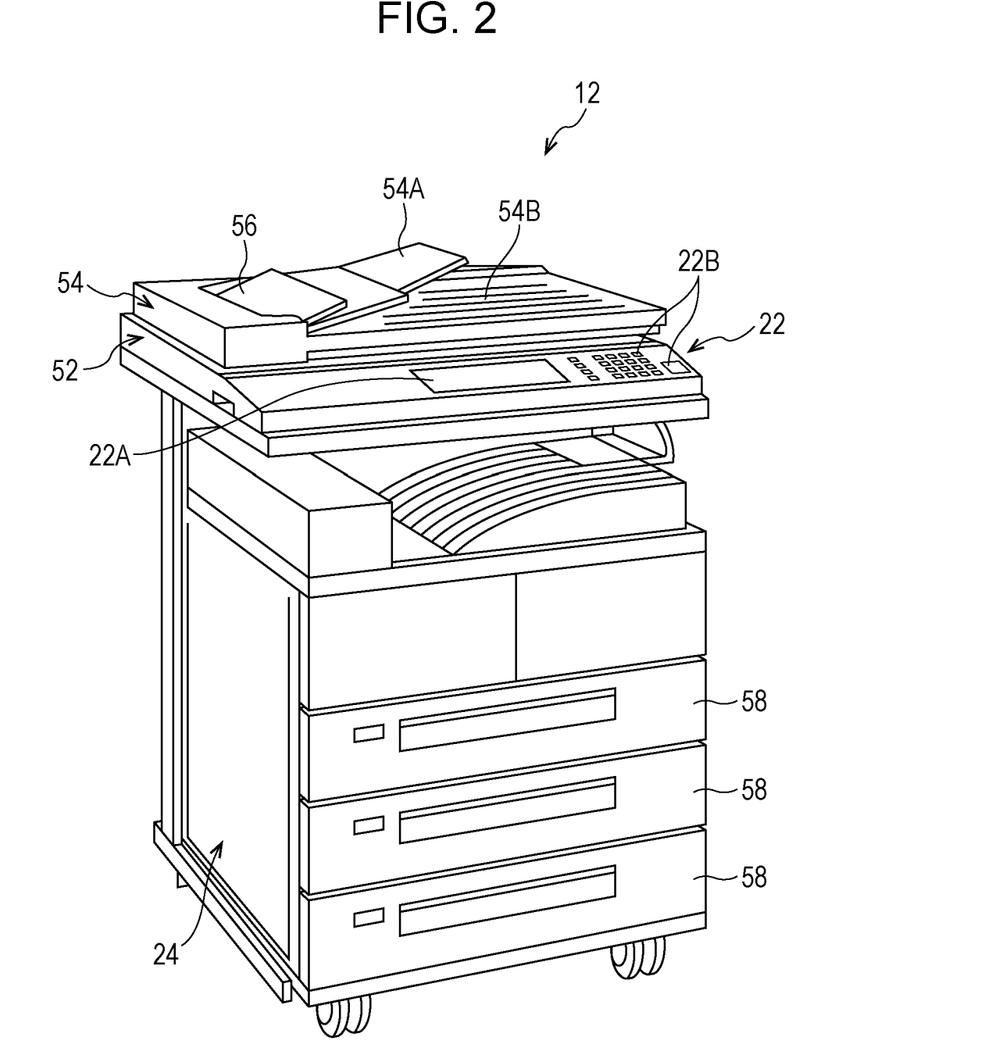
FIG. 2 is a perspective view illustrating the outward appearance of an image forming apparatus according to the exemplary embodiment.

FIG. 2 is a perspective view illustrating the outward appearance of the image forming apparatus 12 according to the exemplary embodiment. The image forming apparatus 12 according to the exemplary embodiment includes a print function for receiving various data via the network 18, and forming an image based on the received data. The image forming apparatus 12 according to the exemplary embodiment also has functions such as a reading function for reading a document to obtain image information representing the document, a copy function for copying an image recorded on the document to a sheet of paper, and a facsimile function for transmitting and receiving various data via a telephone line (not illustrated).

The image forming apparatus 12 according to the exemplary embodiment includes a document reading unit 52 in an upper part of the image forming apparatus 12, and an image forming unit 24 located below the document reading unit 52. The document reading unit 52 includes a document transport unit (not illustrated) inside a document covering part 54. The document transport unit sequentially draws in a document 56 placed on a document feed unit 54A provided in the document covering part 54, transports the document 56 onto platen glass (not illustrated), and reads an image recorded on the document 56. Further, the document transport unit discharges the document 56 from which an image has been read, onto a document output unit 54B provided in the document covering part 54.

The document reading unit 52 is provided with a user interface 22 that receives various instructions given by the user. The user interface 22 includes components such as a display 22A and hardware keys 22B. The display 22A is a touch panel display on which display buttons or various information used to implement receiving of instructions by means of a software program are displayed. The hardware keys 22B include, for example, a ten-key pad and a start button. The user interface 22 is used, for example, to set the number of sheets to copy or the scaling factor when the copy function is used through use of the display buttons on the display 22A or the hardware keys 22B, or as keys such as telephone dial keys when the facsimile function is used.

The image forming unit 24 includes a feed paper storage unit 58 that accommodates paper as a recording medium on which to form an image. In the image forming unit 24, paper accommodated in the feed paper storage unit 58 is drawn out sheet by sheet, and an image based on image data is formed on each sheet of paper by the electrophotographic process, for example. Further, in the image forming unit 24, each sheet of paper on which an image has been formed is sequentially discharged to a paper output unit (not illustrated).

The information processing apparatus 14 transmits an image formation request so that an image is formed on a sheet of paper by means of the print function of the printer 12.

The server 16 has, for example, the function of transmitting an image formation request from the information processing apparatus 14 to the image forming apparatus 12, which is the destination for the request, and the function of monitoring the condition of the image forming apparatus 12 and notifying the information processing apparatus 14 of the condition.

Figure 3:
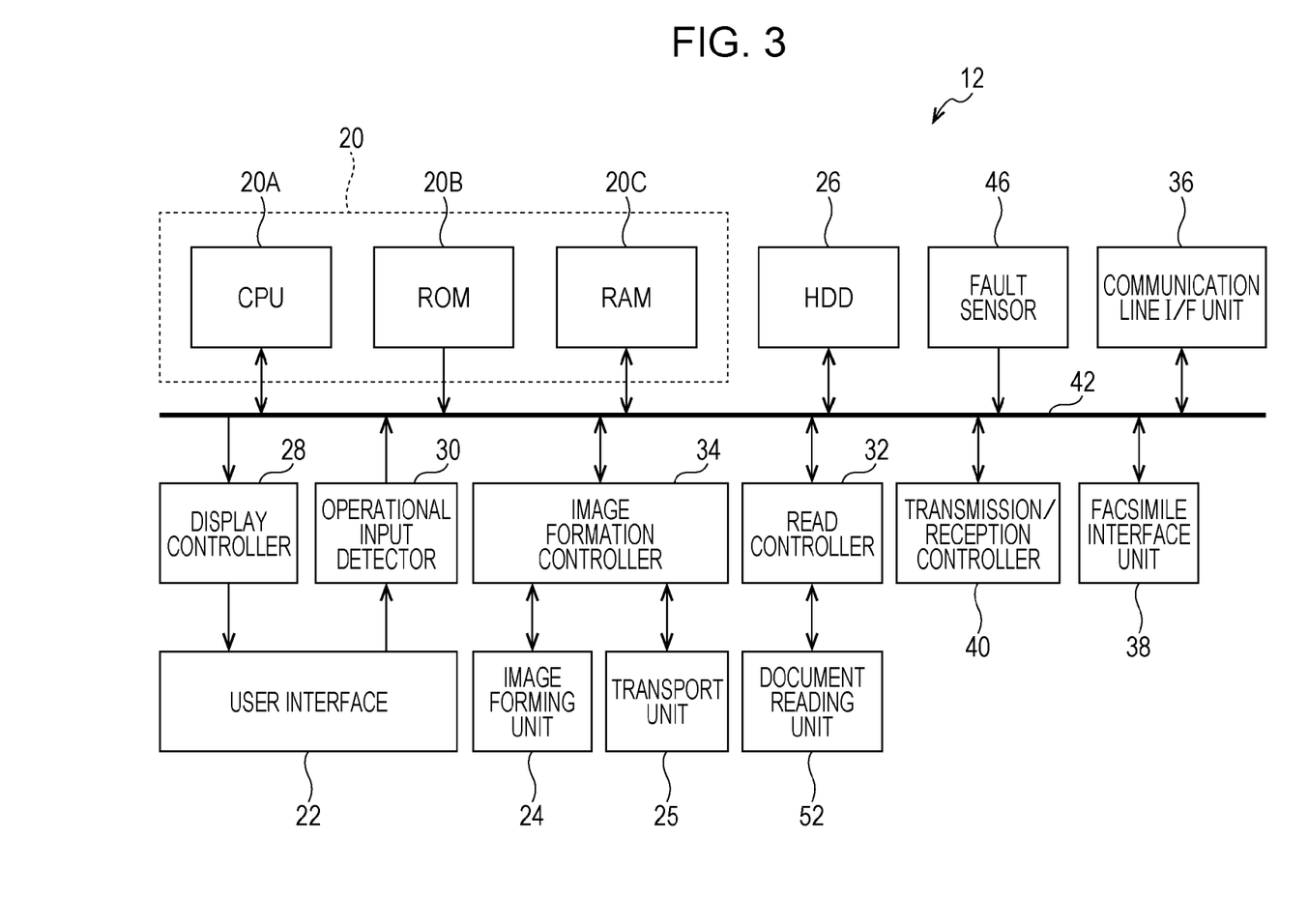
FIG. 3 is a block diagram illustrating the configuration of a major portion of the electrical system of the image forming apparatus according to the exemplary embodiment.

FIG. 3 is a block diagram illustrating the configuration of a major portion of the electrical system of the image forming apparatus 12 according to the exemplary embodiment.

As illustrated in FIG. 3, the image forming apparatus 12 according to the exemplary embodiment has a control unit 20 including a central processing unit (CPU) 20A, a read only memory (ROM) 20B, and a random access memory (RAM) 20C. The CPU 20A is responsible for the overall operation of the image forming apparatus 12. The RAM 20C is used as, for example, a work area when various programs are executed by the CPU 20A. Various control programs, various parameters, and other information are stored in the ROM 20B in advance. In the image forming apparatus 12, various components of the control unit 20 are electrically connected by a system bus 42.

The image forming apparatus 12 according to the exemplary embodiment includes a hard disk drive (HDD) 26 that stores various data, application programs, and other information. The image forming apparatus 12 also includes a display controller 28. The display controller 28 is connected to the user interface 22, and controls display of information such as various operation screens on the display 22A of the user interface 22. Further, the image forming apparatus 12 includes an operational input detector 30. The operational input detector 30 is connected to the user interface 22, and detects an operational instruction that is input via the user interface 22. In the image forming apparatus 12, the HDD 26, the display controller 28, and the operational input detector 30 are electrically connected to the system bus 42. Although the image forming apparatus 12 according to the exemplary embodiment employs the HDD 26 as a memory, this is not to be construed restively. The image forming apparatus 12 may employ other non-volatile memories such as a flash memory.

The image forming apparatus 12 according to the exemplary embodiment includes a read controller 32, and an image formation controller 34. The read controller 32 controls an optical image reading operation performed by the document reading unit 52, and a document feed operation performed by the document transport unit. The image formation controller 34 controls an image forming process performed by the image forming unit 24, and transport of paper to the image forming unit 24 performed by a transport unit 25. Further, the image forming apparatus 12 includes a communication line interface (communication line I/F) unit 36, and a fault sensor 46. The communication line interface unit 36 is connected to the network 18 to transmit and receive communication data to and from other external apparatuses connected to the network 18, such as the server 16. The fault sensor 46 senses the occurrence of a fault in the image forming apparatus 12. Further, the image forming apparatus 12 includes a facsimile interface (facsimile I/F) unit 38 that is connected to a telephone line (not illustrated) to transmit and receive facsimile data to and from a facsimile apparatus connected to the telephone line. The image forming apparatus 12 also includes a transmission/reception controller 40 that controls transmission and reception of facsimile data via the facsimile interface unit 38. In the image forming apparatus 12, the transmission/reception controller 40, the read controller 32, the image formation controller 34, the communication line interface unit 36, the facsimile interface unit 38, and the fault sensor 46 are electrically connected to the system bus 42.

As a result of the configuration mentioned above, in the image forming apparatus 12 according to the exemplary embodiment, the CPU 20A executes access to each of the RAM 20C, the ROM 20B, and the HDD 26. Further, in the image forming apparatus 12, the CPU 20A executes the control of display, via the display controller 28, of information such as an operation screen and various messages on the display 22A of the user interface 22. Further, in the image forming apparatus 12, the CPU 20A executes the control of operations of the document reading unit 52 and the document transport unit via the read controller 32. Further, in the image forming apparatus 12, the CPU 20A executes the control of operations of the image forming unit 24 and the transport unit 25 via the image formation controller 34, and the control of transmission and reception of communication data via the communication line interface unit 36. Further, in the image forming apparatus 12, the CPU 20A executes the control of transmission and reception of facsimile data via the facsimile interface unit 38 performed by the transmission/reception controller 40. Further, in the image forming apparatus 12, the CPU 20A identifies what kind of operation has been made via the user interface 22 based on operational information detected by the operational input detector 30, and executes various controls based on the identified kind of operation.

The fault sensor 46 senses a fault that occurs in the document reading unit 52, the image forming unit 24, the transport unit 25, or other units. Examples of such a fault to be detected include a motor failure in the document reading unit 52 or the transport unit 25, running out of paper stored in the feed paper storage unit 58, and a paper jam in the transport unit 25.

Figure 4:
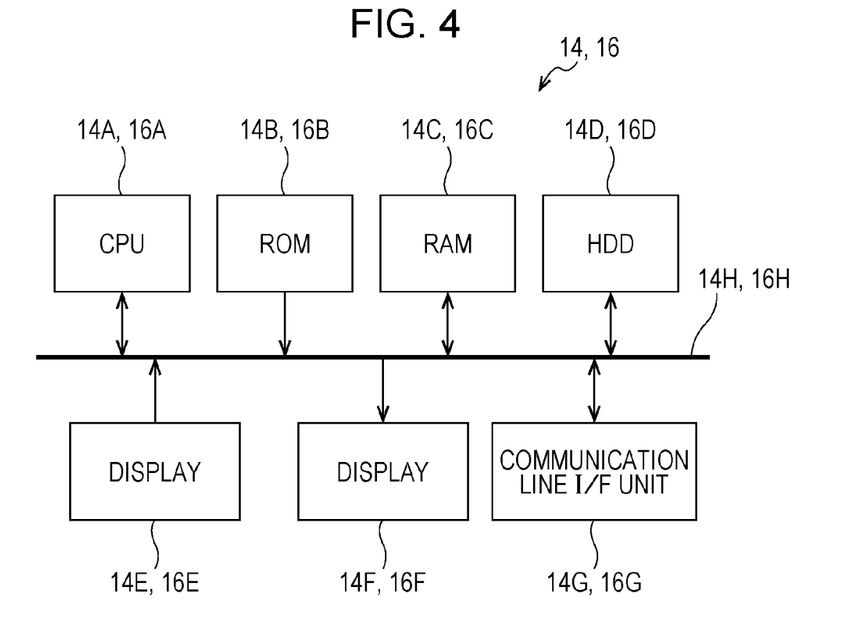
FIG. 4 is a block diagram illustrating the configuration of a major portion of the electrical system of each of an information processing apparatus and a server according to the exemplary embodiment.

Next, the configuration of a major portion of the electrical system of each of the information processing apparatus 14 and the server 16 will be described. FIG. 4 is a block diagram illustrating the configuration of a major portion of the electrical system of each of the information processing apparatus 14 and the server 16. The information processing apparatus 14 and the server 16 are basically of the same configuration as typical computers. Accordingly, the information processing apparatus 14 will be described below as a representative example.

As illustrated in FIG. 4, the information processing apparatus 14 according to the exemplary embodiment includes a CPU 14A, a ROM 14B, a RAM 14C, an HDD 14D, a keyboard 14E, a display 14F, and a communication line interface (communication line I/F) unit 14G. The CPU 14A is responsible for the overall operation of the information processing apparatus 14. Various control programs, various parameters, and other information are stored in the ROM 14B in advance. The RAM 14C is used as, for example, a work area when various programs are executed by the CPU 14A. The HDD 14D stores various data, application programs, and other information. The keyboard 14E is used to input various information. The display 14F is used to display various information. The communication line interface unit 14G is connected to the network 18 to transmit and receive various data to and from other apparatuses connected to the network 18. The above-mentioned units of the information processing apparatus 14 are electrically connected to each other by a system bus 14H. Although the information processing apparatus 14 according to the exemplary embodiment employs the HDD 14D as a memory, this is not to be construed restively. The information processing apparatus 14 may employ other non-volatile memories such as a flash memory.

As a result of the configuration mentioned above, in the information processing apparatus 14 according to the exemplary embodiment, the CPU 14A executes access to the ROM 14B, the RAM 14C, and the HDD 14D, acquisition of various data via the keyboard 14E, and display of various information on the display 14F. Further, in the information processing apparatus 14, the CPU 14A executes the control of transmission and reception of communication data via the communication line interface unit 14G.

If a fault occurs in the image forming apparatus 12, functions related to the fault (such as image reading, image formation, copy, and facsimile) may be rendered unavailable. In this case, users other than the user who has requested for execution of a process affected by the fault do not know the occurrence of the fault. It is thus often the case that these users also request for execution of such a process. However, it is useless to make such a request since it is not possible to execute the requested process due to the fault. Although all of the information processing apparatuses 14 connected to the network 18 may be notified that the fault has occurred, this means notifying even those users or user terminals which are not likely to use the image forming apparatus 12, resulting in unnecessary notification. Such users may find such notification bothersome.

Accordingly, in the exemplary embodiment, upon sensing the occurrence of a fault, the image forming apparatus 12 identifies a user to be notified that the fault has occurred from among pre-registered users, and notifies the information processing apparatus 14 of the identified user that the fault has occurred. The user to be notified of the occurrence of the fault is identified as a user who is likely to use a function that has become unavailable due to the fault in the image forming apparatus 12.

A user who is likely to use a function that has become unavailable due to a fault may be identified by the following method. That is, information about the usage history of each function of the image forming apparatus 12 may be used to identify a user with history of using the function as a user who is affected by the fault. In this case, for each function, function usage history information representing usage of the function by each user is stored in the image forming apparatus 12. When a fault occurs, the stored function usage history information is used to identify which user is likely to use a function that has become unavailable due to the fault. For example, information such as the frequency of use or the time of use is taken into account in identifying which user is likely to use a function that has become unavailable due to the fault.

Alternatively, belonging information about each user (for example, information about the organization to which each user belongs or a room in which each user resides) may be used to identify, as a user to be notified that the fault has occurred, a user who is likely to use the image forming apparatus 12. For example, if the server 16 manages information such as login of the information processing apparatus 14 to the network 18 and belonging information about each user, the control unit 20 acquires such information from the server 16 to thereby acquire belonging information. Then, the control unit 20 uses the acquired belonging information to identify, as a user to be notified that the fault has occurred, a user who is likely to use the image forming apparatus 12.

Alternatively, presence information representing information about the presence of each user may be used to detect whether the user is present, and identify a user who is present as a user to be notified that the fault has occurred. For example, if the server 16 manages information such as login of the information processing apparatus 14 connected to the network 18 to the network 18 and schedule information, the control unit 20 acquires such information from the server 16 to thereby acquire presence information related to the presence of the user. Then, the control unit 20 uses the acquired presence information to identify, as a user to be notified that the fault has occurred, a user who is likely to use the image forming apparatus 12. If the server 16 manages information such as user's location information or information about user's entry or exit of a room by use of an integrated circuit (IC) card or a radio frequency identifier (RFID), the IC card, the RFID, or other information may be used to identify a user who is to be notified that the fault has occurred.

Alternatively, operational information on the information processing apparatus 14 or other information may be used to identify, as a user to be notified that the fault has occurred, a user who is likely to use the image forming apparatus 12. For example, when application software of the information processing apparatus 14 such as document creation software or table creation software is being used, the image forming apparatus 12 is more likely to be used in such a case than when such application software is not being used. Accordingly, the control unit 20 acquires, from the information processing apparatus 14, information indicating the state of use of predetermined application software to thereby identify, as a user to be notified that the fault has occurred, a user who is likely to use the image forming apparatus 12. In this case, the control unit 20 may identify a user who is likely to use the image forming apparatus 12 by acquiring information on operational state about an image formation instruction given by use of the application software (e.g., print dialogue is open).

Alternatively, which user is to be notified may be determined in advance for each type of fault that occurs, and when a fault occurs, a user corresponding to the fault may be determined as a user who needs to be notified that the fault has occurred.

Alternatively, two or more of the above-mentioned identifying methods may be combined to determine a user who needs to be notified that the fault has occurred.

Figure 5:
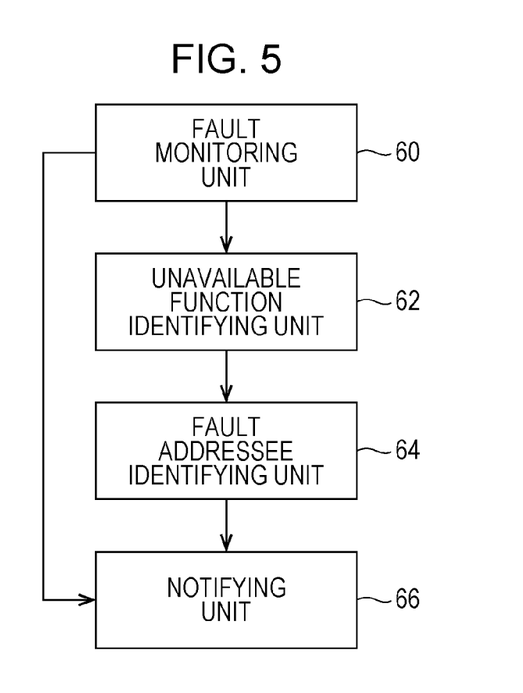
FIG. 5 is a functional block diagram illustrating functions executed by a control unit of the image forming apparatus according to the exemplary embodiment.

Next, specific functions executed by the control unit 20 of the image forming apparatus 12 according to the exemplary embodiment will be described below. FIG. 5 is a functional block diagram illustrating functions executed by the control unit 20 of the image forming apparatus 12 according to the exemplary embodiment.

As illustrated in FIG. 5, the control unit 20 includes functions corresponding to a fault monitoring unit 60, an unavailable function identifying unit 62, a fault addressee identifying unit 64, and a notifying unit 66. In the exemplary embodiment, these functions are implemented by execution of a program by the CPU 20A.

The fault monitoring unit 60 senses the occurrence of various faults in the image forming apparatus 12, and also senses the resolving of the fault that has occurred. Specifically, the fault monitoring unit 60 acquires the result of sensing performed by the fault sensor 46 to sense various faults, such as a motor failure in the document reading unit 52 or the transport unit 25, running out of paper stored in the feed paper storage unit 58, and a paper jam in the transport unit 25. Further, if a fault is sensed, the fault monitoring unit 60 uses information indicative of the result of sensing performed by the fault sensor 46 to sense the resolving of the fault that has occurred. Although the preceding description of the exemplary embodiment is directed to a case in which the fault monitoring unit 60 senses the occurrence of a fault in the image forming apparatus 12 by acquiring information indicative of the result of sensing performed by the fault sensor 46, the method of sensing the occurrence of a fault is not limited to this. For example, the fault sensor 46 may predict the occurrence of a fault, and the fault monitoring unit 60 may acquire information indicative of the prediction result to thereby sense the occurrence of the fault. Alternatively, a configuration for detecting the occurrence of a fault and a configuration for predicting the occurrence of a fault may be both provided, and the occurrence of a fault may be sensed by use of one of the two configurations. Prediction of the occurrence of a fault may be implemented by various known techniques. For example, the occurrence of a fault may be predicted by predicting, for example, the life of various components by monitoring the driving time of the motor or other components, the number of sheets on which an image has been formed, or other information.

The unavailable function identifying unit 62 identifies, upon sensing of the occurrence of a fault by the fault monitoring unit 60, a function that has become unavailable due to the fault. For example, a table that defines an unavailable function for each type of fault as illustrated in FIG. 6A is stored in the HDD 26 or other storages in advance, and an unavailable function corresponding to the type of a fault sensed by the fault sensor 46 is identified.

The fault addressee identifying unit 64 identifies, from among pre-registered users, a user who needs to be notified that the function identified by the unavailable function identifying unit 62 is currently unavailable. In the exemplary embodiment, function usage history information is used to identify, from among pre-registered users (the users of the information processing apparatuses 14 connected to the network 18), a user who has previously used the function that is currently unavailable, or a user who uses the function with a high frequency. Specifically, a user who has used the function that is currently unavailable within a predetermined period of time may be identified as such a user. Alternatively, a user who has used the function within a given period of time with a frequency equal to or greater than a predetermined frequency may be identified as such a user. If it is known in advance that notification is not required for the identified user, such a user for whom notification is unnecessary may be excluded. For example, as illustrated in FIG. 6B, in a table that prescribes, for each user, information such as the destination address for notification and the necessity of notification indicating whether notification is required for the user, function usage history is sequentially stored (updated) in the HDD 26 or other storages in association with each user. This configuration makes it possible to use the table illustrated in FIG. 6A to identify which function has become unavailable from the type of a fault that has occurred, and use the table illustrated in FIG. 6B to identify, by use of the function usage history information for the identified function, which user needs to be notified that the fault has occurred. Now, a case is considered in which a user to be notified is determined in advance for each type of fault, and when a fault occurs, a user who needs to be notified is identified according to the type of the fault that has occurred. In this case, in one example, as illustrated in FIG. 6C, the destination to which notification is to be provided when a fault occurs is determined in advance in the form of a table for each type of unavailable function (such as image reading, copy, or facsimile in FIG. 6C). As a result, this table can be used to identify which user is to be notified that the fault has occurred.

Figure 6A:
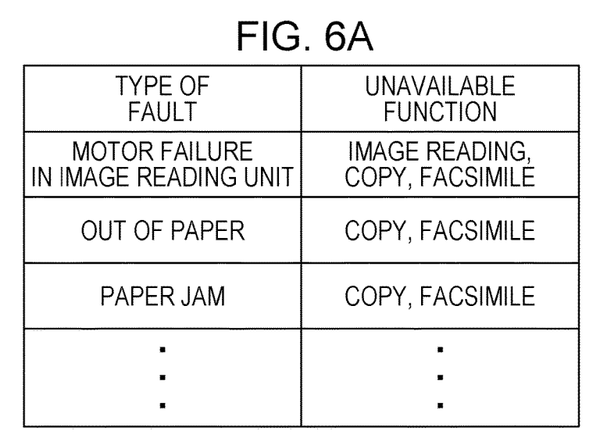
FIG. 6A illustrates an example of a table that defines unavailable functions for each type of fault.
Figure 6B:
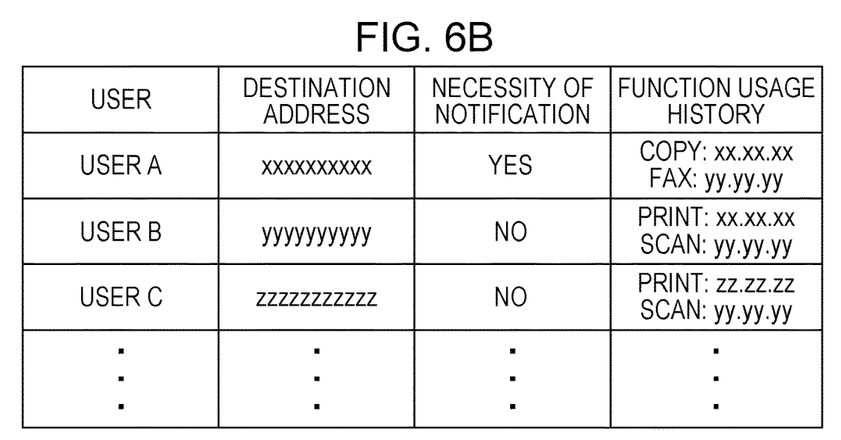
FIG. 6B illustrates an example of function usage history stored in association with each user in a table that prescribes, for each user, a destination address for notification, and the necessity of notification indicating whether the user needs to be notified.
Figure 6C:
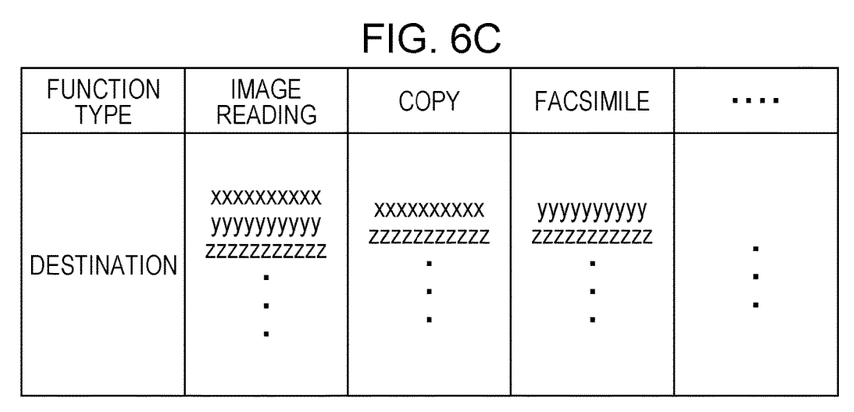
FIG. 6C illustrates an example of a table that prescribes, for each type of unavailable function, destinations to which notification is to be provided when a fault occurs.
Figure 7:
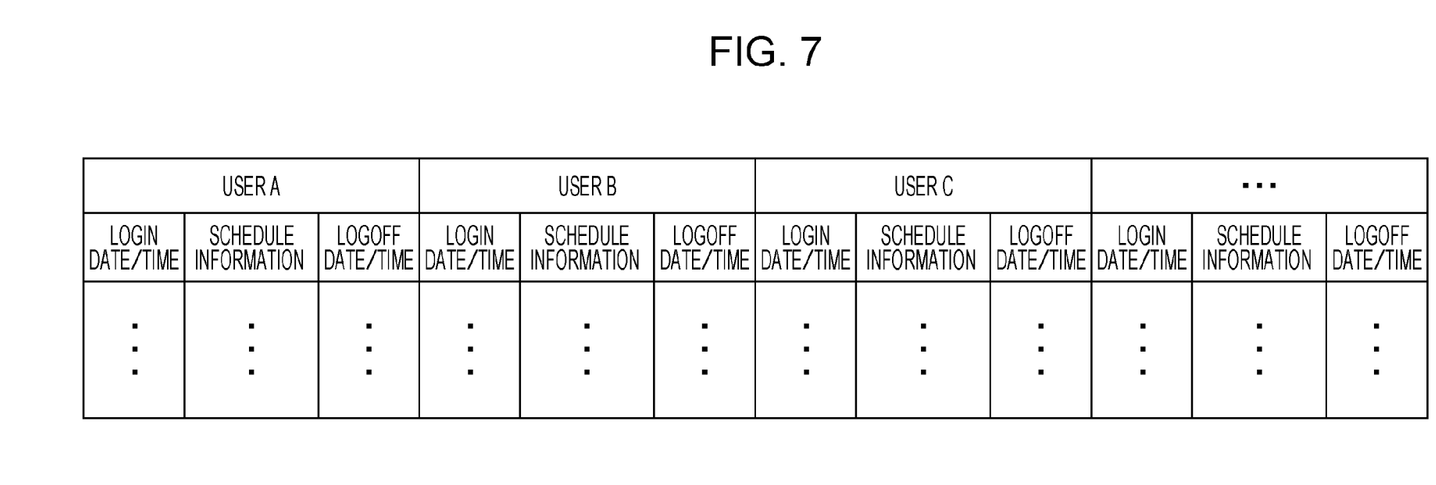
FIG. 7 illustrates an example of a management table for a case where a server manages, for each user, the date/time of login, schedule information, logoff information, and other information.

If multiple users are identified by using the tables illustrated in FIGS. 6A and 6B as users who need to be notified that the fault has occurred, the fault addressee identifying unit 64 may further narrow down the multiple users to identify which user needs to be notified. In one example, if the server 16 manages the date/time of login, schedule information, logoff information, and other information for each user as illustrated in FIG. 7, the control unit 20 may acquire such information from the server 16, and use the acquired information to exclude users who are absent or users who are unlikely to use an identified function. Alternatively, the control unit 20 may detect the information processing apparatus 14 that is not logging in the network 18, and exclude the corresponding user from candidate users to be notified. In one example, the control unit 20 detects a user who is present by acquiring authentication information or login information from a server such as a lightweight directory access protocol (LDAP) server, or by acquiring information from a server such as an Active Directory (registered trademark) server or an Outlook (registered trademark) server developed by Microsoft Corporation. Then, absent users other than the user who is present are excluded. Further, operational information on the information processing apparatus 14 may be acquired to identify a user who is likely to use the image forming apparatus 12 to thereby further narrow down which user is to be notified that the fault has occurred. For example, when a user is running predetermined application software of the information processing apparatus 14, or when a user is performing an operation for instructing that an image be formed (e.g., using a print dialogue), such a user is more likely to use the image forming apparatus 12 than users who are not performing such operations. Accordingly, users who are not performing these operations may be excluded.

The notifying unit 66 notifies the information processing apparatus 14 of the user identified by the fault addressee identifying unit 64 that there is a function currently unavailable due to a fault that has occurred. For example, this notification may be provided by using application software such as a driver required for giving an image formation request from the information processing apparatus 14 to the image forming apparatus 12, or an electronic mail. If the resolving of the fault is sensed by the fault monitoring unit 60, the notifying unit 66 notifies the user who has been notified of the occurrence of the fault that the fault is now resolved.

Figure 8:
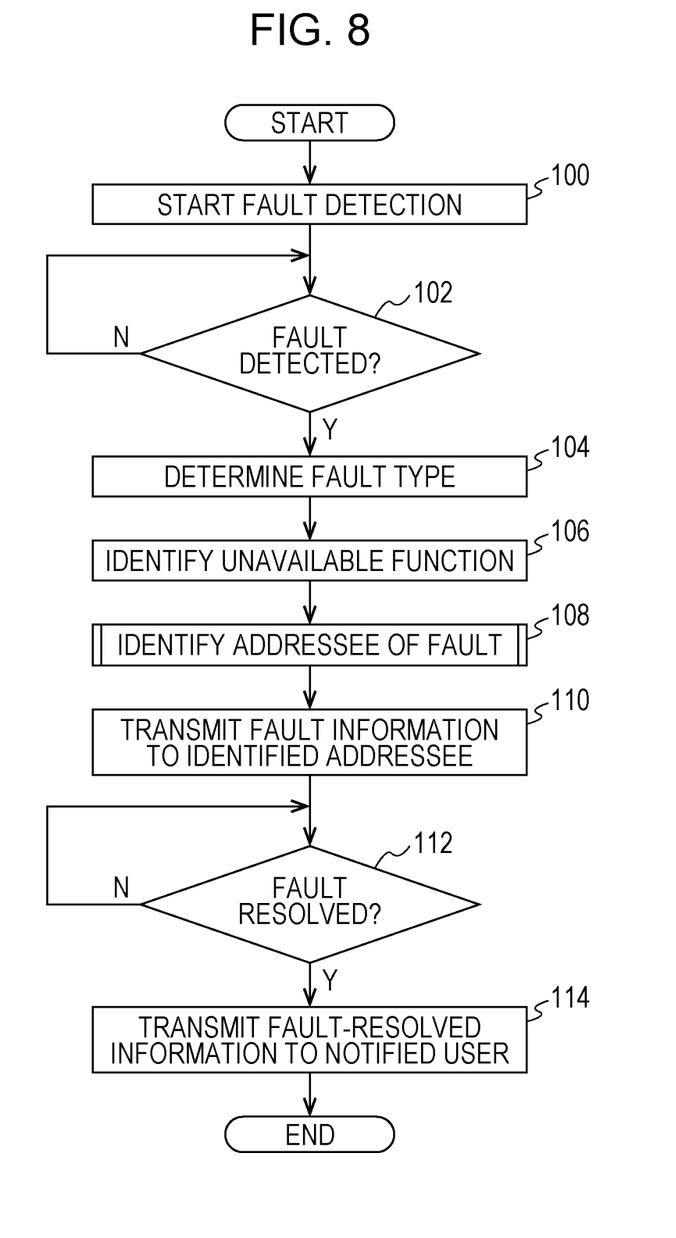
FIG. 8 is a flowchart illustrating an example of a process executed by the control unit of the image forming apparatus according to the exemplary embodiment.

Next, a specific process executed by the control unit 20 of the image forming apparatus 12 according to the exemplary embodiment configured as described above will be described below. FIG. 8 is a flowchart illustrating an example of a process executed by the control unit 20 of the image forming apparatus 12 according to the exemplary embodiment. The process illustrated in FIG. 8 commences when, for example, the image forming apparatus 12 is turned on.

At step 100, the CPU 20A causes the fault sensor 46 to start monitoring of the occurrence of a fault, and proceeds to step 102. That is, the fault monitoring unit 60 starts sensing of a fault.

At step 102, the CPU 20A determines, from the result of sensing performed by the fault sensor 46, whether a fault has been detected. That is, the CPU 20A determines whether a fault is sensed to have occurred by the fault sensor 46, and waits until an affirmative determination is made before proceeding to step 104.

At step 104, the CPU 20A determines the type of the fault, and proceeds to step 106. The determination of the type of fault is made by the fault monitoring unit 60 identifying the fault sensed by the fault sensor 46.

At step 106, the CPU 20A identifies an unavailable function, and proceeds to step 108. That is, a function that has become unavailable due to the fault is identified by the unavailable function identifying unit 62. For example, an unavailable function corresponding to the type of the fault sensed by the fault sensor 46 is identified by using, for example, the table illustrated in FIG. 6A, which is stored in the control unit 20 in advance.

At step 108, the CPU 20A identifies the addressee of the fault (identification of the fault addressee), and proceeds to step 110. That is, the fault addressee identifying unit 64 identifies a user (fault addressee) who needs to be notified that the function identified by the unavailable function identifying unit 62 is currently unavailable. Specifically, as described above, a user who has used the function that is currently unavailable within a predetermined period of time may be identified. Alternatively, a user who has used the function within a given period of time with a frequency equal to or greater than a predetermined frequency may be identified. If it is known in advance that notification is not required for the identified user, such a user for whom notification is unnecessary may be excluded. In one example, the function usage history information in the above-mentioned table illustrated in FIG. 6B is used to identify the fault addressee. As described above, if multiple users are identified as such users, the multiple users may be further narrowed down to identify which user is to be notified that the fault has occurred.

At step 110, the CPU 20A transmits fault information to the information processing apparatus 14 of the identified user, and transfers to step 112. That is, the notifying unit 66 transmits fault information indicating the occurrence of a fault to the information processing apparatus 14 of the user identified by the fault addressee identifying unit 64, thus notifying the user that the function has become unavailable due to the fault.

At step 112, the CPU 20A determines, from the result of sensing performed by the fault sensor 46, whether the fault sensed to have occurred at step 102 as mentioned above has been resolved. That is, the CPU 20A determines whether the resolving of the fault has been sensed by the fault sensor 46, and waits until an affirmative determination is made before proceeding to step 114.

At step 114, the CPU 20A transmits fault-resolved information to the information processing apparatus 14 of the user who has been notified of the occurrence of the fault at step 110 as described above, and ends the series of steps. That is, the notifying unit 66 transmits, to the information processing apparatus 14 of the user who has been notified of the occurrence of the fault, fault-resolved information indicating that the fault has been resolved, thus notifying that the fault has been resolved and the function has become available.

Although the foregoing description of the exemplary embodiment is directed to a case in which the control unit 20 of the image forming apparatus 12 is provided with the functions illustrated in FIG. 5, this is not to be construed restrictively. For example, the server 16 or the information processing apparatus 14 may be provided with some or all of the functions illustrated in FIG. 5.

Processes executed by the image forming apparatus 12, the information processing apparatus 14, or other apparatuses according to the exemplary embodiment mentioned above may be stored as a program on a storage medium and distributed.

The present invention is not limited to the above-mentioned exemplary embodiment. It is needless to mention that the present invention may be embodied in various forms without departing from the scope of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus for providing notification to a user of occurrence of a fault, the information processing apparatus comprising:
   a sensor that senses occurrence of a predetermined fault through one of detection of the occurrence of the fault and prediction of the occurrence of the fault; and
   a processor programmed to:
      when the fault is sensed to have occurred by the sensor, identify a user to be notified that the fault is sensed to have occurred from among a plurality of users registered in advance; and
      notify an information processing terminal of the identified user that the fault has occurred,
   wherein a user that has used a function associated with the fault within a given period of time is identified as the user to be notified.

2. The information processing apparatus according to claim 1,
    wherein the processor is further programmed to:
        identify, by using usage history information of a plurality of users registered in advance, a user affected by the fault that is sensed to have occurred by the sensing sensor; and
        notify an information processing terminal of the identified user that the fault is sensed to have occurred.

3. The information processing apparatus according to claim 2,
    wherein the processor is further programmed to:
        identify a user to be notified that the fault is sensed to have occurred from among a plurality of users registered in advance, by use of information set for each of the users in advance to indicate whether to notify the user of occurrence of the fault.

4. The information processing apparatus according to claim 1,
    wherein the processor is further programmed to:
        identify a user to be notified that the fault is sensed to have occurred from among a plurality of users registered in advance, by use of information set for each of the users in advance to indicate whether to notify the user of occurrence of the fault.

5. The information processing apparatus according to claim 1,
    wherein the processor is further programmed to:
        identify a user to be notified that the fault is sensed to have occurred by determining, by use of user-related information, whether to provide a notification for each of the plurality of users, the user-related information being obtained from at least one of an information processing terminal of each of the plurality of users and a server that manages the information processing terminal of each of the plurality of users.

6. The information processing apparatus according to claim 1,
    wherein sensor further senses resolving of the fault, and
    wherein when the fault is sensed to have been resolved by the sensor, the processor is further programmed to provide a notification that the fault has been resolved to the information processing terminal that has been notified of occurrence of the fault.

7. An information processing system comprising:
    the information processing apparatus according to claim 1; and
    a plurality of information processing terminals of a plurality of users, the plurality of information processing terminals being connected to the information processing apparatus.

8. A non-transitory computer readable medium storing a program causing a computer to execute a process for providing notification to a user of occurrence of a fault, the process comprising:
    sensing, by a sensor, occurrence of a predetermined fault through one of detection of the occurrence of the fault and prediction of the occurrence of the fault; and
    identifying, when the fault is sensed to have occurred, a user to be notified that the fault is sensed to have occurred from among a plurality of users registered in advance, and notifying an information processing terminal of the identified user that the fault has occurred,
    wherein a user that has used a function associated with the fault within a given period of time is identified as the user to be notified.

9. An information processing apparatus for providing notification to a user of occurrence of a fault, the information processing apparatus comprising:
    a sensor that senses occurrence of a predetermined fault through one of detection of the occurrence of the fault and prediction of the occurrence of the fault; and
    a processor programmed to:
        when the fault is sensed to have occurred by the sensor, identify a user to be notified that the fault is sensed to have occurred from among a plurality of users registered in advance; and
        notify an information processing terminal of the identified user that the fault has occurred,
    wherein a user that has used a function associated with the fault within a given period of time with a frequency equal to or greater than a predetermined frequency is identified as the user to be notified.

* * * * *